United States Patent
Vierinen

(10) Patent No.: US 8,463,579 B2
(45) Date of Patent: Jun. 11, 2013

(54) METHODS AND ARRANGEMENTS FOR DETECTING WEAK SIGNALS

(75) Inventor: Juha Vierinen, Sodankylä (FI)

(73) Assignee: Radareal OY (FI)

( * ) Notice: Subject to any disclaimer, the term of this patent is extended or adjusted under 35 U.S.C. 154(b) by 345 days.

(21) Appl. No.: 13/009,023

(22) Filed: Jan. 19, 2011

(65) Prior Publication Data

US 2012/0183035 A1    Jul. 19, 2012

(51) Int. Cl.
*G06F 19/00* (2006.01)

(52) U.S. Cl.
USPC ............................................. 702/181

(58) Field of Classification Search
USPC .................................. 702/181–185
See application file for complete search history.

(56) References Cited

U.S. PATENT DOCUMENTS

| | | | |
|---|---|---|---|
| 2005/0001759 A1 | 1/2005 | Khosla | |
| 2009/0052737 A1 | 2/2009 | Lycett | |
| 2011/0022319 A1* | 1/2011 | Djikpesse et al. | 702/11 |
| 2011/0241927 A1* | 10/2011 | Porikli | 342/90 |

OTHER PUBLICATIONS

Markkanen J et al., "REal-time space debris monitoring with Eiscat" Advances in Space Research, Pergamon, Oxford, GB, vol. 35, No. 7, Jan. 1, 2005, p. 1197-1209, XP027796828.

Wing Ip Tam et al., "An efficient radar tracking algorithm using multidimensional Gauss-Hermite quadratures", IEEE International Conference on Acoustics, Speech, and Signal Processing, 1997. ICASSP-97, Munich, DE Apr. 21-24, 1997, Los Alamitos, CA, USA, vol. 5, Apr. 21, 1997, p. 3777-3780, XP010226623.
International Search Report and Written Opinion for corresponding application No. PCT/FI2012/050041, Jan. 18, 2012.

\* cited by examiner

*Primary Examiner* — Edward Raymond
(74) *Attorney, Agent, or Firm* — Wood, Phillips, Katz, Clark & Mortimer

(57) ABSTRACT

The invention provides a method and an arrangement for detecting moving point-targets within a large set of noisy measurements. The method is based on Bayesian model selection where the measurements containing targets are modeled with their physical trajectories and the non-target measurements are modeled with the statistical distribution of measurements containing no targets. An a posteriori probability density function is utilized together with a optimization algorithm specifically designed for this problem. Advantages of the invention involve a numerically efficient formulation of the a posteriori probability density, combined with the optimization algorithm. The main applications of the invention are in detecting moving targets within e.g., radar, sonar, lidar and telescopic measurements. The method is also applicable for multi-instrument data fusion.

13 Claims, 3 Drawing Sheets

METHODS AND ARRANGEMENTS FOR DETECTING WEAK SIGNALS

TECHNICAL FIELD

The invention concerns generally the detection of a desired features from among a plurality of measurements, only a small part of which are related to the desired features. In particular the invention concerns the use of a search algorithm and an electronic apparatus to separate meaningful measurements from noise and other undesired measurements.

BACKGROUND OF THE INVENTION

Very few receivers of electromagnetic signals can operate in an ideal way, in the sense that the output of the signal reception stage would only consist of meaningful parts of the actual signal to be received. In practically all cases the receiver will simultaneously receive also unwanted signals, such as simultaneous transmissions from others than the source of the desired signal, as well as random noise. Also components of the receiver itself generate noise, which is summed to the actual signals at the output of the reception stage. The problem of separating the desired signal from noise has certain universal, commonly applicable features regardless of what purpose (e.g. communications, remote sensing, etc.) the signal serves.

The traditional approach to separating the desired signal from noise at the reception stage is based on filtering. For example, if a carrier frequency of the desired signal is known, the receiver may use a band pass filter to reject signals at frequencies that differ from the known carrier frequency more than half the width of a relatively narrow pass band. Filtering in the time space means only qualifying receiver output that occurs within a time interval that is known (or assumed) to correspond to the desired signal. Matched filters are devices that correlate the received signal with some code that is known to occur in the desired transmission, and so on. However, some noise will always have characteristics similar to those of the desired signal with certain accuracy, and hence despite all filtering, the output of the reception stage will always contain also unwanted signal components. The problem is prominent especially if the energy levels associated with the desired signal are low compared to the levels of coincident noise energy.

As an example we will consider the detection of relatively small, relatively faraway objects such as space debris with a radar. The transmitter of an ionospheric radar emits an electromagnetic transmission, usually a regularly repeated short pulse train, into a measurement direction pointing to the sky. A radar receiver receives echoes, which are the results of scattering of the transmission by meteors, space debris, and other targets that are capable of interacting with electromagnetic radiation at the frequency in use. Space debris comes in sizes ranging from dust and paint flakes to complete bodies of obsolete satellites. For the purposes of the present invention the smaller end of the size scale is the most important, because of the large number (hundreds of thousands) and the difficult detectability of small man-made objects orbiting the Earth. It is easy to understand that a radar echo produced by an object only some centimetres across at the distance of several hundreds or even thousands of kilometres can not be very powerful compared to measurement noise, even if very large (tens of metres in diameter) parabolic antennas are used.

FIG. 1 illustrates schematically an arrangement, in which a radar station 101 has made measurements of the sky above. Each black dot represents an individual measurement. Depending on the characteristics of the radar receiver, the signal processing capability, and the algorithms available, each measurement may represent a combination of different measured quantities. Typical quantities to be obtained as raw data are the round-trip delay it took for the transmission to be transmitted, scattered, and received; as well as the Doppler shift that the scattering target caused. From these the range (distance between the radar station and the target that caused the echo), radial velocity, and radial acceleration of the target can be calculated. The term "radial" refers to the direction of the straight line combining the radar and the scattering target. Radars equipped with monopulse feeds, as well as phased array systems, are also capable of measuring the angle or arrival from a point target.

We assume that during the time interval under examination, exactly one solid object orbiting the Earth has crossed the antenna beam. Some of the detected echoes were actually caused by said solid object, while the others are false echoes that represent either actual scattering of the radar transmission but by non-orbiting objects (such as meteors), or simply noise. The white dots marked with a vertical uncertainty bar are the actual target-related measurements in FIG. 1, and the curve 102 represents its orbit around the Earth. The problem is to decide, which of the (potentially very large number of) measurements should actually be taken into account as representing the orbiting object. Each dot in FIG. 1 is drawn with a velocity vector that represents the velocity that can be read from the radar measurement for the corresponding echo. It is intuitively very easy to understand that the velocity vectors of the echoes related to the actual orbiting target follow quite closely its orbit and are relatively close to each other in magnitude, while the velocity vectors of the other echoes may have any arbitrary direction and magnitude.

Combining multiple measurements of a moving target into one unified description of the target in terms of trajectory is a common problem in remote sensing. A wide variety of methods exists for solving this problem. Perhaps the most commonly used method is the so called detection threshold method, which relies on the fact that when a signal is strong enough compared to the noise level, it has to be a target with a very high probability. However, this approach suffers from several shortcommings. It cannot cope very well with active radar jamming, and it cannot be used to detect weaker targets, as the false alarm rate would be too large.

FIG. 2 illustrates schematically a similar problem that occurs in communications. A transmitting device 201 uses original data 202 to produce a transmission, which it emits in the form of a modulated electromagnetic carrier wave signal towards a receiving device 203. In order to find out the payload contents of the transmission, the receiving device 203 produces a series 204 of measurements that reflect what was received. Each individual measurement may contain values of one or more quantities such as phase, amplitude, and/or frequency. Again, only some of the measurements at the receiving device 203 are actually associated with the original transmission, while others represent interference or noise. Again, for example if the transmitting device wanted to conceal its transmission among noise to avoid detection by hostile parties, it may be difficult for the receiving device to decide, which measurements it should take into account for reconstructing the original data.

SUMMARY OF THE INVENTION

An objective of the present invention is to present methods and arrangements for producing an organized subset from a multitude of measurements, wherein each measurement is a value or a set of values that describe characteristics of an assumed target, and wherein said multitude of measurements have been obtained by processing a received electromagnetic signal.

An objective of the invention can also be described as to present methods and arrangements for producing a probable description for a multitude of measurements, wherein each measurement is a value or a set of values that describe characteristics of an assumed target, and wherein said multitude of measurements have been obtained by some form of remote sensing, e.g. by processing a received electromagnetic signal in a radar, sonar, or lidar system.

The objectives of the invention are achieved by arranging the measurements in a ranked order, proceeding through the measurements in said ranked order and each time testing, whether associating a measurement with a particular target would increase the probability of the multitude of measurements describing the assumed behaviour of targets.

According to one aspect of the invention there is provided a method for producing an organized subset from a multitude of measurements, wherein each measurement is a value or a set of values that describe characteristics of an assumed target, and wherein said multitude of measurements has been obtained by processing a received electromagnetic signal, such as a signal received in one or more remote sensing systems, the method comprising:
  arranging the multitude of measurements to a ranked order according to a measurement-specific value, the magnitude of which is assumed to correlate with a reliability of the measurement,
  initially designating individual measurements in said multitude of measurements as not being associated with a target,
  calculating an initial probability density
  picking from said multitude of measurements a measurement that is not associated with a target,
  selecting from said multitude of measurements a candidate correlating measurement,
  calculating a probability density reflective of the picked measurement and the candidate correlating measurement being associated with a same target,
  as a response to the calculated probability density being indicative of higher probability than the initial probability density, marking the picked measurement and the candidate correlating measurement as being associated with the same target, and
  outputting, as the organized subset, those measurements that have been marked as being associated with the same target.

According to another aspect of the invention there is provided an apparatus for producing an organized subset from a multitude of measurements, wherein each measurement is a value or a set of values that describe characteristics of an assumed target, and wherein said multitude of measurements has been obtained by processing a received electromagnetic signal, the apparatus comprising:
  a data arranging unit configured to arrange the multitude of measurements to a ranked order according to a measurement-specific value, the magnitude of which is assumed to correlate with a reliability of the measurement,
  a data designator configured to initially designate individual measurements in said multitude of measurements as not being associated with a target,
  a probability density calculator configured to calculate an initial probability density, and
  a data selector configured to pick from said multitude of measurements a measurement that is not associated with a target;
wherein:
  said data selector is additionally configured to select from said multitude of measurements a candidate correlating measurement,
  said probability density calculator is additionally configured to calculate a probability density reflective of the picked measurement and the candidate correlating measurement being associated with a same target,
  as a response to the calculated probability density being indicative of higher probability than the initial probability density, said data designator is configured to mark the picked measurement and the candidate correlating measurement as being associated with the same target, and
  the apparatus is configured to output, as the organized subset, those measurements that have been marked as being associated with the same target.

According to yet another aspect of the invention there is provided a computer program product comprising, on a computer-readable medium, machine-readable instructions that, when executed on a computer, cause the computer to implement a method for producing an organized subset from a multitude of measurements, wherein each measurement is a value or a set of values that describe characteristics of an assumed target, and wherein said multitude of measurements has been obtained by processing a received electromagnetic signal, the method comprising:
  arranging the multitude of measurements to a ranked order according to a measurement-specific value, the magnitude of which is assumed to correlate with a reliability of the measurement,
  initially designating individual measurements in said multitude of measurements as not being associated with a target,
  calculating an initial probability density
  picking from said multitude of measurements a measurement that is not associated with a target,
  selecting from said multitude of measurements a candidate correlating measurement,
  calculating a probability density reflective of the picked measurement and the candidate correlating measurement being associated with a same target,
  as a response to the calculated probability density being indicative of higher probability than the initial probability density, marking the picked measurement and the candidate correlating measurement as being associated with the same target, and
  outputting, as the organized subset, those measurements that have been marked as being associated with the same target.

The method presented in this description differs from previous methods as it utilizes a combination of a holistic Bayesian statistical target model and a customized optimization algorithm that searches for the peak of the a posteriori probability density arising from the combined model and prior distributions of the target trajectory parameters. In this approach, there is one single statistically and physically motivated optimality criterion, which determines when a target is detected.

The main challenge with the Bayesian probability density approach is the fact that the model space, i.e., the number of possible different models that can explain the measurements, is too large to be exhaustively searched through. To address this problem, we have developed a custom optimization algorithm that only scans through likely regions of the search space, e.g., making use of the fact that moving targets that pass the radar beam are closely spaced together in time and space.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND EMBODIMENTS

An embodiment of the invention will be discussed in the framework of space debris investigations made with the EISCAT (European Incoherent Scatter Radar) radar equipment.

Combining multiple detections of a moving target into one unified description of the target in terms of trajectory is a fairly common problem in radar and telescopic measurements. A wide variety of methods exists for solving this problem, but these are mostly optimized for on-line analysis of air traffic control radars with low false detection rates.

We take a different approach to the problem by inspecting the global probability density of all measurements using the Bayesian framework, avoiding many heuristic processing steps and simplifying the problem. We also give one possible algorithm that can be used to search for the maxima of the probability density—or in this case, the set of targets and their trajectories.

The current space debris analysis used for EISCAT measurements is a three-step procedure that involves:
1. Coherent integration in blocks
2. Combining integration blocks into events
3. Improving target detection accuracy.

Initially, a certain duration of time is coherently integrated. In addition to searching for the most probable Doppler shift and range gate, different accelerations are also searched. If necessary, the computations in this stage can be accelerated with an algorithm known as FastGMF and described in the patent publication U.S. Pat. No. 7,576,688, which is incorporated herein by reference. Alternatively, the grid search can also be accelerated using the non-uniform (in time and frequency) fast Fourier transform, as has been shown by Keiner, J., Kunis, S., and Potts, D. in their study "Using NFFT 3—a software library for various nonequispaced fast Fourier transforms ACM Trans. Math. Software". The first step of the analysis procedure is reasonably well described already in earlier studies but the second step has not yet been properly addressed until now.

The second step consists of determining which coherent integration blocks (or measurements) belong to the same target and which integration blocks do not contain anything meaningful. In this description, we focus on a model and an optimization algorithm that can be used for addressing problems involved step two, in a close to optimal but computationally efficient way.

Step three involves using the trajectory obtained in the detection step (2) to improve the target trajectory estimate. The optimal way would be to use the original raw voltage data, and fit a trajectory directly into the raw voltage data. This can be done for example using MCMC (Markov Chain Monte Carlo) methods or using a combination of grid and gradient search methods. The computations can be sped up significantly by using results of the detection step as an initial guess for the target parameters. We will not discuss step three in this description.

Moving Point Target Model

Figure 1:
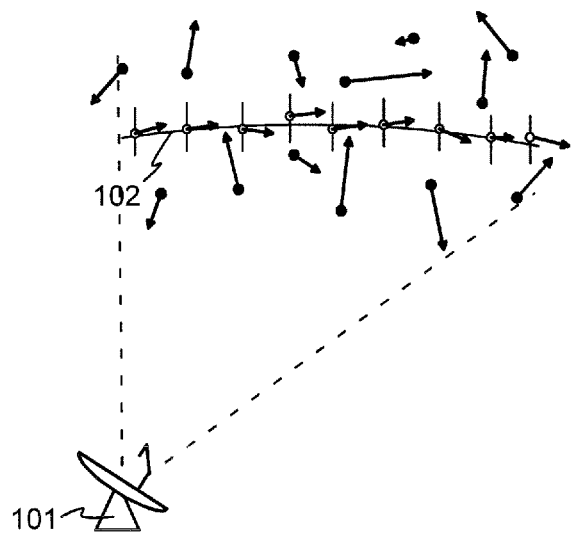
FIG. 1 illustrates finding measurements that are associated with a trajectory of a target.
Figure 2:
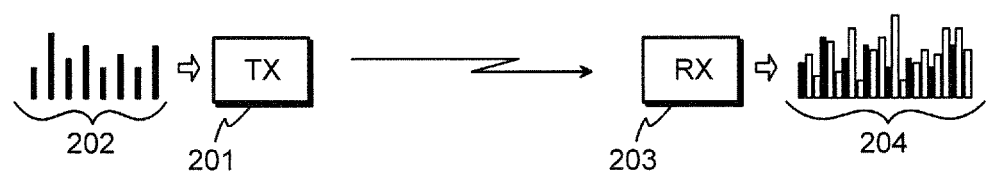
FIG. 2 illustrates finding measurements that are associated with a transmitted signal.

Our data is a set of N noisy measurements $M=(m_1, \ldots, m_N)$ of target trajectory related information, where each measurement can contain several measurable quantities. Typically, the measurement $m_i=(r_i, \dot{r}_i, \sigma_i)$ contains signal amplitude $\sigma_i$, range $r_i$ and velocity $\dot{r}_i$ at time instant $t_i$. We will assume this is the case in the following description, although many of the derivations are also applicable in cases where no Doppler or amplitude values are available. The majority of these measurements are not expected to contain information about any target at all, and they are expected to consist of instrumental noise, or more generally just something else than the desired signal. This set-up is similar to what was described earlier with reference to FIG. 1 and FIG. 2.

It is essential to note that the concept of "measurement" refers in this description to a value or a set of values that describe characteristics of an assumed target. Thus for example the momentary voltage value at the output of a radar receiver is not a "measurement" in the sense of this description, but "raw data" or "raw voltage data". As a comparison to communications, where the "target" to be detected is the correct content of a transmitted symbol, a "measurement" would be an estimate of said content. We assume that a multitude of measurements has been obtained by processing a received electromagnetic signal In the example above the measurement is a set of three values, namely range, velocity, and amplitude, of which the latter is a direct indicator of the interaction cross section of the target with the radar signal. It is typical to both remote sensing and communications applications that in order to obtain a "measurement" a not insignificant amount of signal processing has to be performed already. Above such signal processing has been referred to as coherent integration in blocks, which is the case especially in remote sensing applications.

The problem is to determine the number $N_{ev}$ of unique targets with unique trajectories that are contained in the set of measurements, their approximate trajectories, and which measurements contain information about each detected target. Bayesian model selection provides a way of assigning a probabilty density for different models and their parameters $$p(k, \theta^{(k)} \mid D) = \frac{p(D \mid k, \theta^{(k)}) p(\theta^{(k)} \mid k) p(k)}{p(D)}, \qquad (1)$$

where $p(k, \theta^{(k)}|D)$ is the a posteriori probability density for different models k and their corresponding model parameters $\theta^{(k)}$. $p(D|k, \theta^{(k)})$ is the likelihood function, which describes the probability of the measurement given a model and set of model parameters. $p(\theta^{(k)}|k)p(k)$ is the a priori density for the models and model parameters. $p(D)$ is the probability of the data, and it can be thought of as a normalization constant.

In the case of detecting point targets, the number of different models k is astronomical. Assuming that each target n is described by a set of unique measurements $I_n$, with each measurement belonging to not more than one target, the number of different models is given by the Bell number:

$$B_N = \sum_{k=0}^{\infty} \frac{k^N}{k!}, \tag{2}$$

which grows extremely fast, e.g. $B_{20} \approx 5.1 \cdot 10^{13}$ and $B_{30} \approx 8.5 \cdot 10^{23}$. This means that in practice we cannot perform an exhaustive search through all the possible models unless the number of measurements is very small. For larger sets of measurements, it is only possible to consider a smaller subset of all the possible models. This is why we have to develop a algorithm that only goes through a small subset of the model space.

In order to evaluate $p(D|k, \theta^{(k)})$, we have to be able to establish a forward theory that describes the measurements in terms of model parameters. In this case, we assume that the target trajectory of each detected target can be described with some parametric function, e.g., in the case of monostatic space debris measurements, the measured range and radial Doppler velocity can be described using a polynomial description of the radial trajectory as $r_n(t; \theta_n) = r_n + v_n t + a_n t^2$ and $\dot{r}_n(t; \theta_n) = v_n + a_n t$, with target specific parameters $\theta_n = (r_n, v_n, a_n)$ and $\theta^{(k)} = U_n \theta_n$, where $r_n(t; \theta_n)$ signifies a description of the radial location, $r_n$ is range, $v_n$ is scalar radial velocity, $a_n$ is scalar radial acceleration, t is time, and $\dot{r}_n(t; \theta_n)$ signifies a description of the radial velocity. The index k indicates one particular arrangement of the sets $I_n$.

The particular polynomial description given above is just one choice to parametrize the trajectory, and it is not a limitation of the invention. In other situations the parametrization might take a different form in order to describe the target better. For example space debris circles the Earth, which in a short timespan is well approximated by a steady Keplerian orbit. In the case of a multi-static observation, it would advantageous to use this parametrization for the trajectory. In a reconnaissance radar different parametrizations could be employed depending on whether the assumed target is an aeroplane, a sea-going vessel, or a land vehicle. In a communications application it is often possible to utilize typical regularities in the transmitted signal to present a parametrization of its assumed behaviour as detected by the receiver, e.g. by employing a Markov Chain communication model. The parametrization does not need to be linear, but choosing a linear parametrization if one is available may simplify the calculations considerably.

Coming back to the space debris measurements as an example, and assuming that our measurements consist of range $r_i$ and Doppler velocity measurements $\dot{r}_i$, we can now express the forward theory as $$r_i = \begin{cases} r(t_i; \theta_n) + \xi_i, & i \in I_n \\ v_i, & i \notin U_n I_n \end{cases}, \text{ and} \tag{3}$$

$$\dot{r}_i = \begin{cases} \dot{r}(t_i; \theta_n) + \xi'_i, & i \in I_n \\ v'_i, & i \notin U_n I_n \end{cases}, \tag{4}$$

where $\xi_i$ and $\xi'_i$ are the measurement errors for the range and radial velocity measurements. Measurements that don't belong to any target detection are described with the random variables $v_i$ and $v'_i$, which have a distribution that models the instrumental noise. For example, in the case of space debris measurements, this is very close to uniformly distributed noise.

Assuming that the range and velocity errors are zero mean and Gaussian with $\xi_i \sim N(0, \vartheta_i^2)$ and $\xi'_i \sim N(0, \varrho_i^2)$, we can write the likelihood of our measurements as $$p(D|k, \theta^{(k)}) = \kappa C \exp\{-S\}, \tag{5}$$

where the sum of squares term is $$S = \sum_{n=1}^{N_{ev}} \sum_{i \in I_n} \frac{1}{2\vartheta_i^2}(r_i - r_n(t_i; \theta_n))^2 + \frac{1}{2\varrho_i^2}(\dot{r}_i - \dot{r}_n(t_i; \theta_n))^2 \tag{6}$$

and C is the normalization factor $$C = \prod_{n=1}^{N_{ev}} \prod_{i \in I_n} \frac{1}{2\pi \vartheta_i \varrho_i} \tag{7}$$

and $\kappa$ contains the probability of the non-targets, i.e. the probability density of $v_i$ and $v'_i$. In this case, we assume that they are uniformly distributed, $$\kappa = (\Delta_r \Delta_v)^{-N_n}, \tag{8}$$

with prior ranges $\Delta_r = r_{max} - r_{min}$ and $\Delta_v = v_{max} - v_{min}$. The number of measurements that contain actual events is $$N_p = \sum_{n=1}^{N_{ev}} \#I_n$$

and the number of non-events events is $N_n = N - N_p$.

The prior distribution for our model space $p(k) = B_N^{-1}$ is assumed to be uniform, giving each model equal probability. Also, the prior distribution for model parameters $p(\theta^{(k)}|k)$ is assumed to be uniformly distributed:

$$p(\theta^{(k)}|k) = (\Delta_r \Delta_v \Delta_a)^{-N_{ev}}, \tag{9}$$

with the additional uniform distribution for the acceleration parameter $\Delta_a = a_{max} - a_{min}$.

The logarithmic posteriori density, leaving out the constant terms, can now be written as $$\log p(\theta^{(k)}, k|D) = -S - \alpha N_n - \beta N_{ev} + \log C, \tag{10}$$

where $$\alpha = \log \Delta_r \Delta_v \tag{11}$$

and $$\beta = \log \Delta_r \Delta_v \Delta_a \tag{12}$$

The complete result would be to study the full posterior probability distribution, but because of the vast search space, this would be difficult or impossible to do in most practical cases. Instead, we suggest searching for the peak of the distribution:

$$(\hat{k},\hat{\theta}^{(k)}) = \arg\max\nolimits_{k,\theta^{(k)}} p(\theta^{(k)}, k | D). \quad (13)$$

Doing even this exhaustively may require a discouragingly large amount of resources, as there is a very large number of models—going through e.g. the more than $10^{274}$ possibilities required for 200 measurements is not possible in practice at least at the time of writing this description. However, it is usually not necessary to exhaustively search through all models in order to come up with meaningful results. In the case of radar measurements of space debris and meteor head echos, the events are localized in time and range, and additionally we also have an estimate of the errors related with each measurement as they depend on signal power. Using this information, it is possible to sort the model space in terms of relevance, so that the most probable areas with targets are processed first and the areas that are the least likely to contain meaningful targets are processed last, and to obtain a reasonably good estimate of equation (13).

The specific formulation of the a posteriori density in equation (10) results in a simple logarithmic probability density form that can be efficiently evaluated. The formulation starts by assuming that measurements either belong to a moving point target, or they don't. The moving targets are modeled using some parametric trajectory, while the measurements not containing any targets are assumed to span a finite parameter space uniformly.

The a posteriori probability density does not necessarily need to result in a form of Eq. (10). In some cases it can be more profitable to model the trajectory using another parametric form, or to model the non-targets using a different distribution than the uniform distribution that resulted in Eq. (10). E.g., in the case of active radar jamming, the distribution of Doppler and range measurements can be completely different than in the case no jamming, where only ground clutter and receiver noise are the main contributing factors.

Restricted Grid Search

In order to maximize the logarithmic probability of the measurements, we have devised a heuristic search algorithm that utilizes the fact that measurements with large signal power give better estimates, and the fact that targets passing the radar are localized in range and time.

The algorithm initially sorts all measurements in decreasing order of measured signal power $\sigma_i$. We start with the assumption that all measurements are non-targets, and calculate the initial posteriori probability density. Then we go through each measurement in decreasing order of signal power, and attempt to fit the trajectory model to measurements that are temporally close by. These attempts are made one by one, solving the maximum likelihood parameters for S with matrix equations at each step. The measurements are marked as belonging together if the posteriori probability density is increased. If measurements are marked as belonging to some event, they will not be used for other events.

Figure 3:
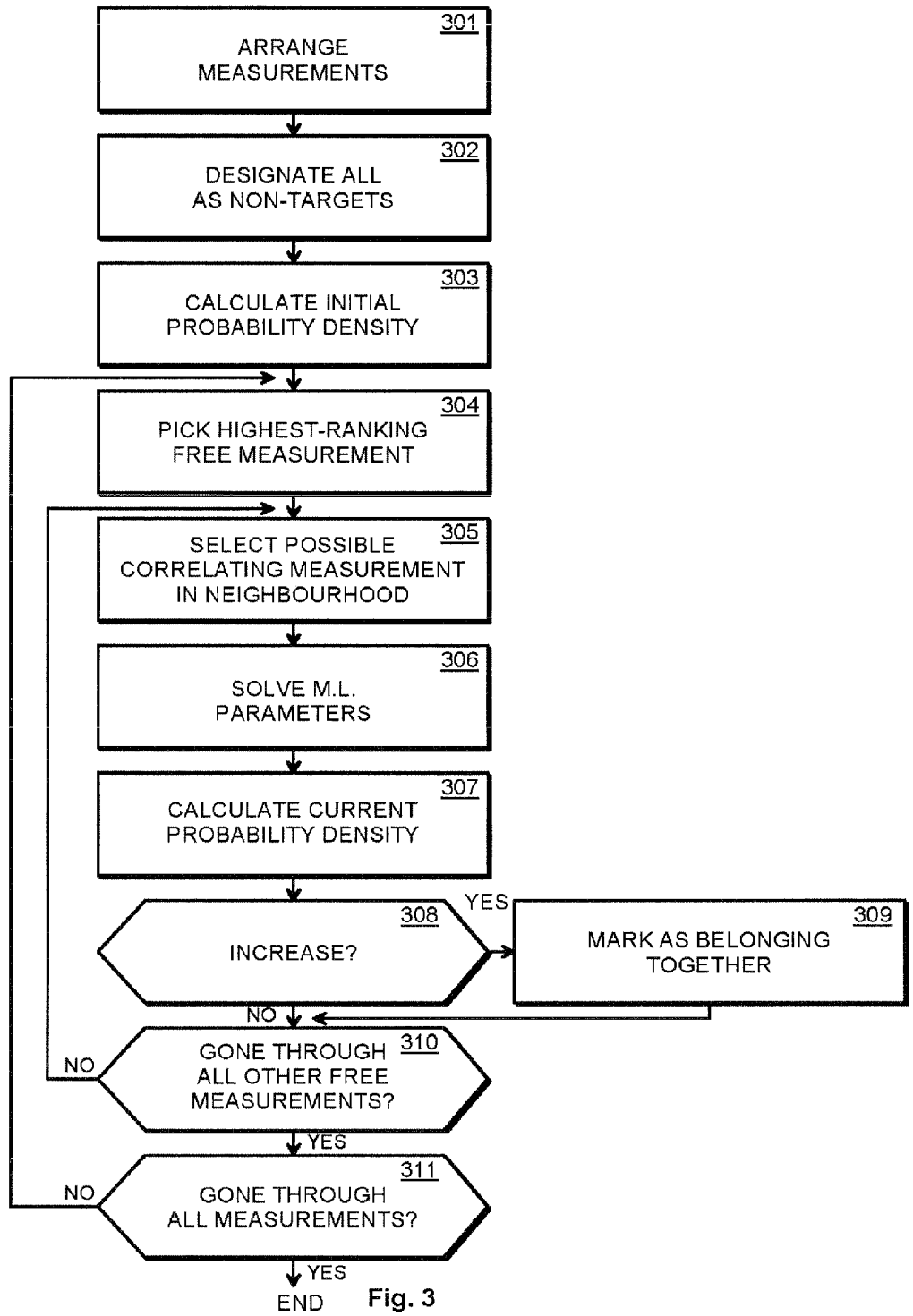
FIG. 3 illustrates a method and a computer program product according to an embodiment of the invention.

FIG. 3 illustrates a method and a computer program product for the restricted grid search. At step 301 the measurements are arranged to a ranked order according to a measurement-specific value, the magnitude of which is assumed to correlate with a reliability of the measurement. In the case of locating orbiting point targets with radar, the measurement-specific signal power is a natural candidate. In some other cases the value used to decide the order could be selected differently. For example a radar, sonar, or lidar arrangement could be used to detect an approaching missile or other threatening object, the typical velocity of which can be known with certain reliability. In such a case the highest-ranking measurements could be those where the velocity value contained in the measurement was closest to the assumed actual velocity.

Steps 302 and 303 are initializing steps where all measurements are initially designated as not belonging to or being associated with any target (step 302) and the initial probability density is calculated (step 303). The last-mentioned gives a kind of a threshold value that can be used for comparisons, because it indicates, how probable it should be to obtain the current set of measurements by just looking at the clear sky with no orbiting objects currently in view. In order to accept a later found combination of two or more measurements as an indication of a point target that actually crossed the radar beam, a probability value higher than at least the initial probability calculated at step 303 should be obtained.

The currently highest-ranking measurement that has not yet been marked as belonging to (or associated with) a particular target is picked at step 304, and a candidate correlating measurement is selected at step 305. In this description we use consistently the verb "to pick" and its derivatives to refer to the measurement picked at step 304, and the verb "to select" and its derivatives to refer to the candidate measurement selected at step 305. Once a particular measurement has been picked as the picked measurement, a number of candidate measurements can be selected at their turn in order to find out, which of them (if any) can be associated with the same target as the currently picked measurement.

The selection of the candidate correlating measurement is made according to a criterion that again should involve some insight about how the sought-after targets actually behave. In radar measurements of space debris it is natural to assume that if a particular target produced a clear echo at some time t, it will also produce a similar echo at a slightly differing time $t \pm \Delta t$. Again thinking about the approaching missile as an alternative example, the candidate correlating measurement could be selected on the basis that it was made in the same or only slightly different spatial direction. The invention does not limit the criterion that is used to select the candidate correlating measurement at step 305, as long as it reflects the above-mentioned insight of how actual targets should behave.

More generally we may consider a particular picked measurement as setting up a "neighbourhood" within a coordinate system defined by measurement-specific characteristics. As an example, a measurement may comprise measurement-specific values for time (the exact time at which the measurement was made), distance (the distance at which the measurement indicates a target to be), and velocity (the velocity at which the measurement indicates a target to move). A neighbourhood set up by that measurement in the time-distance-velocity coordinate system would include such other measurements that consist of sufficiently similar time, distance, and velocity values, taken the assumed behaviour of the target. In other words, only such other measurements are included in said neighbourhood that could possibly relate to the same target. If an approaching missile is looked for, and a picked measurement indicates an approaching velocity of 600 m/s at a distance of 15 kilometres, it is not reasonable to think that another measurement indicating a withdrawing velocity of 100 m/s at 20 kilometres only shortly thereafter would relate to the same target. Therefore said other measurement would obviously not be included in the neighbourhood of the currently picked measurement.

In mathematics it is customary to use the concept of norm to investigate, how close to each other two points are in some coordinate system. In any coordinate system, there exist multiple ways of defining a norm, A very frequently used norm is a the Euclidean norm, which is the square root of the sum of squares of the coordinates. The calculation of an Euclidean norm may be weighted, if it is assumed that the coordinates involved come with differences in significance. For example, if a measuring arrangement is assumed to produce more accurate values of distance than velocity of targets, it may be advantageous to give the distance coordinate more weight in defining the neighbourhood of a measurement and calculating how close two measurements are to each other in said neighbourhood. Numerous other ways of defining and calculating a norm are known and can be used.

Since a norm can express the "closeness" of two measurements very conveniently even with a single value, a predetermined limit may be set to an acceptable neighbourhood of a measurement by giving a limiting value for the norm. A measurement is then closer than said predetermined limit to another measurement, if the value of a predetermined norm calculated for these two measurements exceeds a limiting value that corresponds to said predetermined limit. The definition of the norm to be used, as well as the limiting value for the norm, reflect knowledge of the assumed behaviour of the target. Therefore by changing the definition of the norm, and/or by changing the limiting value, the same method can be applied to different kinds of applications.

The definition of the norm, and its known association to the assumed physical characteristics of the target, may involve different limiting considerations for the different coordinates on which the norm is based. These limiting considerations may even vary dynamically according to the values included in the currently picked measurement. As an example, if the currently picked measurement includes a velocity value 1 km/s (i.e. if the currently picked measurement is assumed to represent a target that is moving at 1 km/s), it is clear that within a time frame of, say, ±5 seconds, the target could not have moved very much further than 5 km in distance. Some other picked measurement might include a velocity value 2 km/s, so plausible candidate measurements to be associated with the same target might well have a distance coordinate differing by 10 km within the same time frame of ±5 seconds. At step 306 the maximum likelihood parameters are solved for S, typically with matrix equations. The calculation of the current probability density is shown separately as step 307. In figurative terms, the probability density calculated at step 307 is reflective of the picked measurement and the candidate correlating measurement being associated with a same target and tells, how probable it would be to obtain the current set of measurements, if during the time when the measurements were obtained, there was a target in view which had the range, velocity and acceleration values as indicated by the currently picked measurement and the candidate correlating measurement. Therefore the calculated probability density is compared to the highest previously calculated probability density at step 308. If the calculated probability density represents an increase to the highest previously calculated probability density, the measurement picked at step 304 above and the candidate correlating measurement selected at 305 above are marked at step 309 as belonging to a common target. In other words they are not any more "free" measurements, where "free" means not associated with any target.

Speaking of "higher probability" is customary, but it should not be understood restictively, because in some calculating algorithms the signs and/or the value axes have been selected so that actually a smaller value indicates higher probability. Therefore we may generalize by saying that the calculated probability density may be indicative of higher probability than the previously calculated probability density.

Possibly looping back from step 310 to step 305 means that once a highest measurement was picked at step 304, other free measurements (e.g. all remaining free measurements that are closer than a predetermined limit to the picked measurement, in the sense of a predetermined norm) are gone through in order to find all those measurements, the grouping together of which increases the probability density. When this run-through has been made for a particular measurement picked above at step 304, a transition to step 311 occurs, where it is checked, whether free measurements were left that did not belong to any of the targets found so far. If yes, a return to step 304 occurs where the highest-ranking measurement still free is picked. Thereafter the inner loop consisting of steps 305 to 310 is again repeatedly circulated in order to find matching pairs for the currently picked measurement from among the remaining free measurements in its neighbourhood.

The concept of a neighbourhood is very practical in limiting the amount of calculations that need to be made. In principle it would be possible to go through all possible combinations of all measurements with each other, in order to find out the one for which the probability density would be the highest. In practice this is possible only for very small sets of measurements, as has been shown above with reference to formula (2). Selecting the candidate measurements only from the neighbourhood of the picked measurement represents an important part of the concept of restricted grid search.

If there are sufficient resources (time and processing power) for calculations, it is advantageous to define a relatively large neighbourhood. This ensures that as many as possible of the measurements that actually relate to a common target will be found. After all, various error sources affect the eventual values that will be contained in the measurements, which means that measurements that quite certainly represent the same target may occur even relatively far from each other in the sense of the norm.

According to an embodiment of the invention, observing the closeness of measurements with each other and setting a limit to how many candidate measurements are gone through can be separated from each other. As an example, the norm may have been defined as an Euclidean norm that takes into account time, velocity, and distance. Candidate measurements are gone through in an increasing order of their norm value, i.e. by proceeding within the neighbourhood of the picked measurement from the closest possible candidate measurement outwards. However, the limit of how many candidate measurements will be gone through is not defined as a maximum value of the whole norm, but simply as a maximum value of time. Other measurements will simply not be selected as candidate measurements if they have been made more than, say. ±5 seconds away from the picked measurement. This example illustrates the choice of using three different coordinates to calculate the norm but only one of them to set the limiting value.

The limiting value may be as simple as a counted number of candidate measurements, which counted number may or may not have some dynamic relation to other characteristics of the set of measurement data. As an example, one may terminate looping back from step 310 to step 305 when 0.1% of those measurements have been selected as candidate measurements that are closer in time to the picked measurement than half a minute.

The algorithm continues to process all or some significant portion of the measurements and will at some point terminate, as illustrated by the arrow down from step 311. If the computation is halted at some point of time, e.g., due to real-time processing requirements, the algorithm has already processed the echos with the smallest estimations errors, i.e., the ones most likely to contain a target. As a result, there is output an organized subset that contains those measurements that have been marked as being associated with the same target. In case several targets were found, there are output the measurements themselves as well as an indication of which measurements were associated with a common target in each case.

Figure 4:
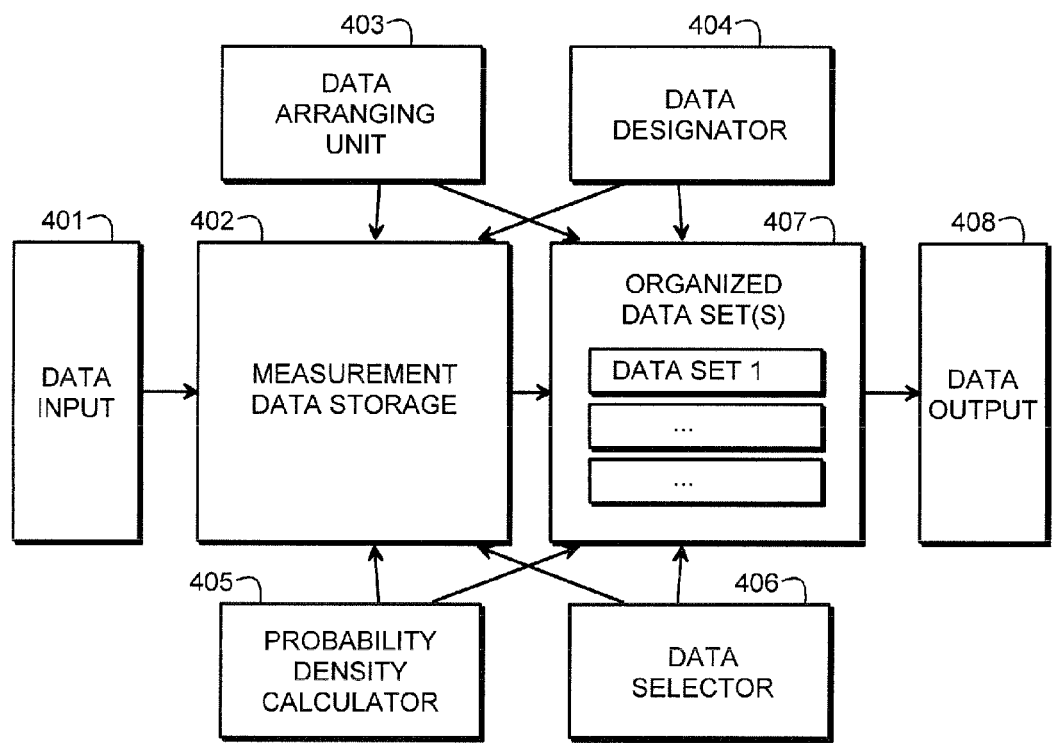
FIG. 4 illustrates an apparatus according to an embodiment of the invention.

FIG. 4 is a schematic illustration of an apparatus according to an embodiment of the invention. The apparatus is configured to receive data through a data input 401, which is for example a wired or wireless connection to a computer, or an interface for receiving portable data storage means, a local area network connection or a wide area network connection. Especially the apparatus is configured to receive as data a large number of measurements, so that each measurement has been obtained by processing a received electromagnetic signal, and each measurement is a value or a set of values that describe characteristics of an assumed target. At least a large majority of the measurements should each contain a measurement-specific value, the magnitude of which is assumed to correlate with a reliability of that particular measurement. The apparatus comprises a measurement data storage 402 configured to store the received measurements.

The apparatus comprises a data arranging unit 403, which is configured to arrange the measurements to a ranked order according to said measurement-specific value, the magnitude of which is assumed to correlate with a reliability of the measurement. The apparatus comprises also a data designator 404, which is configured to initially designate individual stored measurements as not being associated with a target. Further parts of the apparatus are a probability density calculator 405, which is configured to calculate an initial probability density, and a data selector 406, which is configured to pick from said multitude of measurements a measurement that is not associated with a target and additionally configured to select from said multitude of measurements a candidate correlating measurement. The probability density calculator 405 is configured to calculate a probability density reflective of the picked measurement and the candidate correlating measurement being associated with a same target. The data designator 406 is configured to, as a response to the calculated probability density being indicative of higher probability than the initial probability density, mark the picked measurement and the candidate correlating measurement as being associated with the same target.

The concepts of picking and marking of measurements may be conceptually imaged as utilizing a memory 407 of organized data sets, in which one or more data sets are stored. In this conceptional thinking, a data set in the memory 407 consists of measurements that have been marked as being associated with a common target. In a way, the data arranging unit 403, the data designator 404, and the data selector 406 cooperate to go through the initially anonymous multitude of measurements in the measurement data storage 402, so that as a result, those of the measurements that have true meaning eventually end up into well-specified entities within the memory 407 of organized data sets. Physically this does not need to mean transferring any measurements between actual memory circuits or locations, because memory management techniques known from prior art allow organizing and handling records stored in a memory as logical entities that logically belong to a certain part of the memory or logically change into a different part of the memory, even if physically they stay stored at the one and the same location of physical memory.

The apparatus is configured to output, as an organized subset, those measurements that have been marked as being associated with the same target. In the block diagram the apparatus comprises a data output 408 dedicated to this purpose. The output 408 may be for example a wired or wireless connection to a computer, or an interface for writing data into portable data storage means, a local area network connection or a wide area network connection. Outputting data may comprise displaying some of the data or its derivatives on a display device.

Blocks 403, 404, 405, and 406 are advantageously implemented as machine-readable instructions stored on a memory medium, so that executing said machine-readable instructions by a processor causes the apparatus to implement those steps that have been described earlier in a more detailed manner as a method. Blocks 402 and 407 are advantageously implemented as machine-readable and -writable memory means together with their associated memory management software and hardware.

Further Considerations

In a basic form the restricted grid search selects candidate measurements beginning from the one which is closest (in the sense of the applied norm) to the currently picked measurement. If the probability density calculated after selecting the closest candidate measurement is higher than the initial probability density, the closest candidate measurement is marked as being associated with the same target as the currently picked measurement. After that the next closest measurement is selected as the candidate measurement.

A false association with the same target is possible. We may consider a case where measurement X was picked, and measurements A and B are found in its neighbourhood, A being the closest. In reality, measurements X and B come from the same target, but measurement A does not. Accidentally it happens, however, that the probability density calculated first for the association of measurements X and A is higher than the initial probability density. Consequently measurement A becomes erroneously associated with the same target as measurement X. Then, when measurement B is selected as the candidate measurement and the next probability density is calculated for all measurements X, A, and B, a lower value is obtained (because in reality, A and B were not related at all). What happens is that measurement B is rejected, and the erroneous association X+A is maintained.

These kind of errors can be avoided by calculating, after each selection of a candidate measurement, the probability density for all possible combinations of the selected candidate measurement, the candidate measurements previously marked as associated with the same target, and the picked measurement. However, the number of calculations becomes very easily prohibitively large, unless an equally large amount of processing power is available. One way for checking for errors might be to do, among the group of candidate measurements marked as associated with the same target, a number of random modifications and to look, whether any of them further improves the calculated probability density.

The present invention may take advantage of the calculation algorithm previously known from the U.S. Pat. No. 7,576,688. In its original form, said algorithm gives out an individual measurement, which in the sense of statistical analysis is the one within a number of measurements that has the highest probability of representing an actual target. For the purposes of the present invention, any number of measurements in decreasing order of probability can be taken out of said algorithm, for later use as picked measurements. By using the original measurement data, a neighbourhood can be set up around each measurement so identified, in order to find out, whether there are more measurements that could be associated with the same target as the picked measurement in question.

If the present invention is applied to telecommunications, one may consider reconstructing a transmitted message at the receiver using a so-called Markov chain approach. Most original signals involve some kind of regularity, like the known frequent occurrence of certain characters together. A part of the received signal that represents a character (or a short character string) can be thought of as a "measurement" in the parlance used earlier in this description. If one such part has been received and decoded, associating a further measurement with it could be considered as increasing the probability density if, taken the known regularity laid down by some known basic property of the message, a further message part derived from that particular measurement could occur together with the first part at a high probability.

As an example, we may consider that said known basic property of the message is its language, say, French. A part of the signal has been received and decoded, and found out to contain the character string "qu". In French it is fairly common that the next character following that particular string is a vowel, mostly "e" or "i". Thus if receiving and decoding a further part of the signal gives such a vowel, it can be associated with the first part with relatively high certainty. In other words, associating the character string "qu" and for example further part "e" with the same "target", i.e. the same portion of the received signal, probably results in decoding this portion of the received signal correctly.

In the foregoing description we have frequently referred to using the received, measurement-specific power level as the criterion of arranging the set of measurements into ranked order. In doing so it should be taken into account that at least in some cases there may be strong signals present that are not related to the desired targets at all. For example in wireless telecommunication applications in hostile environments there may be jammer signals, which are powerful radio signals produced by an adverse party and aimed at disrupting communications. In such cases it may be advisable to use some other measurement-specific value than power as the criterion for arranging the measurements into ranked order. If power is still used as the criterion, the known presence of high-power unwanted signals underlines the significance of making the restricted grid search cover also the lower end of the ranked order as far as computationally possible, because it may happen that measurements actually describing the desired targets only appear a way down the ranked order.

A specific area of application of the present invention is constituted by multi-instrument measurements. In many cases a number of different instruments (and/or a number of separate channels used by a single instrument) measure the same targets. A multi-instrument measurement may be for example a combination of two radars located at different locations, operating at possibly different frequencies. It is possible to combine measurements from these two different systems within one analysis using the same algorithm. In multi-instrument measurements care should be taken in defining the norm that is used to set up the neighbourhood of a measurement, so that factors that can be considered most reliable have the highest significance in the norm. For example if the instruments are separate radars, the distance coordinate is typically more reliable than the time and velocity coordinate, so one might consider weighing especially distance in the definition of the norm. A natural measurement ranking measure would in this case be the sum of the two signal powers. One particular advantage of the present invention in its ability to produce organize subsets from a large set of measurements, where even a very large majority of the original measurements may actually come from no target at all. The organized subsets produced according to the invention contain, with high probability, a large portion of those measurements that actually do come from a target. The invention ensures that the production of such organized subsets can be accomplished with a reasonable demand of processing power and calculating time.

What is claimed is:

1. A method for producing an organized subset from a multitude of measurements, wherein each measurement is a value or a set of values that describe characteristics of an assumed target, and wherein said multitude of measurements has been obtained by processing a received electromagnetic signal, the method comprising:
   arranging the multitude of measurements to a ranked order according to a measurement-specific value, the magnitude of which is assumed to correlate with a reliability of the measurement,
   initially designating individual measurements in said multitude of measurements as not being associated with a target,
   calculating an initial posterior probability density,
   picking from said multitude of measurements a measurement that is not associated with a target,
   selecting from said multitude of measurements a candidate correlating measurement,
   calculating a posterior probability density reflective of the picked measurement and the candidate correlating measurement being associated with a same target,
   as a response to the calculated posterior probability density being indicative of higher probability than the initial posterior probability density, marking the picked measurement and the candidate correlating measurement as being associated with the same target, and
   outputting, as the organized subset, those measurements that have been marked as being associated with the same target.

2. A method according to claim 1, wherein:
   at the step of picking a measurement, the highest-ranking measurement in said ranked order that is still not associated with any target is picked.

3. A method according to claim 1, wherein:
   as a response to the calculated posterior probability density being indicative of lower probability than the initial posterior probability density, the current candidate correlating measurement is replaced with another selected candidate correlating measurement, and
   the steps of
      calculating a posterior probability density reflective of the picked measurement and the current candidate correlating measurement being associated with a same target,
      as a response to the calculated posterior probability density being indicative of higher probability than the initial posterior probability density, marking the picked measurement and the candidate correlating measurement as being associated with the same target and
      as a response to the calculated posterior probability density being indicative of lower probability than the initial posterior probability density, the current candidate correlating measurement is replaced with another selected candidate correlating measurement
   are repeated, while maintaining the same picked measurement, until essentially all measurements that were not yet associated with any target and that are closer than a predetermined limit to said picked measurement have been selected at their turn as a candidate correlating measurement, wherein a measurement is closer than said predetermined limit to another measurement if the value of a predetermined norm calculated for these two measurements exceeds a limiting value that corresponds to said predetermined limit.

4. A method according to claim 3, wherein:
at the step of replacing the current candidate correlating measurement with another selected candidate correlating measurement, said another selected candidate correlating measurement is a measurement that is still not associated with any target and that has not yet been selected as a candidate correlating measurement for the currently picked measurement, and the selection of the candidate correlating measurement is made according to an assumed behaviour of the sought-after targets.

5. A method according to claim 3, wherein:
after essentially all measurements that were not yet associated with any target have been selected at their turn as a candidate correlating measurement while maintaining the same picked measurement, said picked measurement is replaced with the highest-ranking measurement in said ranked order that is still not associated with any target,
the cycle of picking every time the highest-ranking measurement in said ranked order that is still not associated with any target and repeating the steps of claim 3 with the picked measurement is repeated until a predetermined ending criterion is fulfilled, and
as the organized subset, there are output all those measurements that were marked as being associated with the same target as some other measurement, together with an indication of which measurements were associated with a common target.

6. A method according to claim 4, wherein said ending criterion is fulfilled at the occurrence of at least one of:
all remaining measurements still not associated with any target have been selected at their turn as candidate correlating measurement for each picked measurement, or
a time limit for producing said subset expires.

7. A method according to claim 1, wherein calculating a posterior probability density means calculating the logarithmic posterior probability density $\log p(\theta^{(k)}, k|D)$ as $$\log p(\theta^{(k)}, k|D) = -S - \alpha N_n - \beta N_{ev} + \log C,$$

where
k is an index of possible models that explain the association of measurements with targets,
$\theta^{(k)}$ signifies the model parameters of a k:th possible model,
D signifies the data, i.e. the multitude of measurements, $$S = \sum_{n=1}^{N_{ev}} \sum_{i \in I_n} \frac{1}{2\vartheta_i^2}(r_i - r_n(t_i; \theta_n))^2 + \frac{1}{2\varrho_i^2}(\dot{r}_i - \dot{r}_n(t_i; \theta_n))^2$$

n is a summing index,
$N_{ev}$ is the number of unique targets that are contained in the set of measurements according to a currently selected model,
i is a summing index,
$I_n$ signifies the multitude of measurements,
$\vartheta_i^2$ is the variance of a first quantity, such as range, in a measurement,
$r_i$ is the value of the first quantity, such as range, in an i:th measurement,
$r_n(t_i; \theta_n)$ is a parameterized representation of an assumed behaviour of the first quantity for the n:th target
$\varrho_i^2$ is the variance of a second quantity, such as velocity, in a measurement,
$\dot{r}_i$ is the value of the second quantity, such as velocity, in an i:th measurement,
$\dot{r}_n(t_i; \theta_n)$ is a parameterized representation of an assumed behaviour of the second quantity for the n:th target
$\alpha = \log \Delta_r \Delta_v$
$\beta = \log \Delta_r \Delta_v \Delta_a$
$\Delta_r$ is the assumed range of allowable values for the first quantity,
$\Delta_v$ is the assumed range of allowable values for the second quantity,
$\Delta_a$ is the assumed range of allowable values for a third quantity, such as acceleration, in a measurement,
$N_n$ is the number of non-target measurements that are contained in the set of measurements according to a currently selected model, and
C is a normalization factor.

8. A method according to claim 1, wherein:
the measurements are value sets indicative of spatial location and dynamic movement of targets measured with a radar, sonar, or lidar.

9. A method according to claim 1, wherein:
the measurements are value sets indicative of at least one of frequency, amplitude, and phase of symbols transmitted as sequences of electromagnetic oscillation.

10. An apparatus for producing an organized subset from a multitude of measurements, wherein each measurement is a value or a set of values that describe characteristics of an assumed target, and wherein said multitude of measurements has been obtained by processing a received electromagnetic signal, the apparatus comprising:
a data arranging unit configured to arrange the multitude of measurements to a ranked order according to a measurement-specific value, the magnitude of which is assumed to correlate with a reliability of the measurement,
a data designator configured to initially designate individual measurements in said multitude of measurements as not being associated with a target,
a posterior probability density calculator configured to calculate an initial posterior probability density, and
a data selector configured to pick from said multitude of measurements a measurement that is not associated with a target;
wherein:
said data selector is additionally configured to select from said multitude of measurements a candidate correlating measurement,
said posterior probability density calculator is additionally configured to calculate a posterior probability density reflective of the picked measurement and the candidate correlating measurement being associated with a same target,
as a response to the calculated posterior probability density being indicative of higher probability than the initial posterior probability density, said data designator is configured to mark the picked measurement and the candidate correlating measurement as being associated with the same target, and
the apparatus is configured to output, as the organized subset, those measurements that have been marked as being associated with the same target.

11. An apparatus according to claim 10, wherein the apparatus is a remote sensing apparatus configured to receive electromagnetic signals from a remote target and to process the received electromagnetic signals to form said multitude of measurements.

12. An apparatus according to claim 10, wherein the apparatus is a communications apparatus configured to receive electromagnetic signals from a remote transmitting device and to process the received electromagnetic signals to form said multitude of measurements.

13. A computer program product comprising, on a non-transitory computer-readable medium, machine-readable instructions that, when executed on a computer, cause the computer to implement a method for producing an organized subset from a multitude of measurements, wherein each measurement is a value or a set of values that describe characteristics of an assumed target, and wherein said multitude of measurements has been obtained by processing a received electromagnetic signal, the method comprising:

arranging the multitude of measurements to a ranked order according to a measurement-specific value, the magnitude of which is assumed to correlate with a reliability of the measurement, initially designating individual measurements in said multitude of measurements as not being associated with a target, calculating an initial posterior probability density picking from said multitude of measurements a measurement that is not associated with a target, selecting from said multitude of measurements a candidate correlating measurement, calculating a posterior probability density reflective of the picked measurement and the candidate correlating measurement being associated with a same target, as a response to the calculated posterior probability density being indicative of higher probability than the initial posterior probability density, marking the picked measurement and the candidate correlating measurement as being associated with the same target, and outputting, as the organized subset, those measurements that have been marked as being associated with the same target.

\* \* \* \* \*